United States Patent [19]

Aoki et al.

[11] Patent Number: 4,698,873

[45] Date of Patent: Oct. 13, 1987

[54] EXTENSIBLE AND CONTRACTIBLE WIPER ARM ASSEMBLY FOR WINDSHIELD WIPER

[75] Inventors: Akio Aoki, Hatano; Mitio Sato, Isehara, both of Japan

[73] Assignees: Nissan Motor Company, Limited, Yokohama; Ichikoh Industries Limited, Tokyo, both of Japan

[21] Appl. No.: 819,587

[22] Filed: Jan. 17, 1986

[30] Foreign Application Priority Data

Jan. 22, 1985 [JP] Japan .................................. 60-9516
Jan. 22, 1985 [JP] Japan .................................. 60-9517

[51] Int. Cl.⁴ .............................................. B60S 1/26
[52] U.S. Cl. ............................... 15/250.21; 15/250.23
[58] Field of Search ........... 15/250.21, 250.23, 250.35, 15/250.13, 250.29

[56] References Cited

U.S. PATENT DOCUMENTS 3,831,220 8/1974 Gmeiner et al. .................. 15/250.21
4,447,928 5/1984 Schuch et al. ................... 15/250.23

FOREIGN PATENT DOCUMENTS 2417128 10/1975 Fed. Rep. of Germany .
2430831 1/1976 Fed. Rep. of Germany ... 15/250.23
3125628 12/1982 Fed. Rep. of Germany .
3447438 5/1985 Fed. Rep. of Germany .
2548605 1/1985 France .
55-1570 1/1980 Japan .

Primary Examiner—Peter Feldman
Attorney, Agent, or Firm—Schwartz, Jeffery, Schwaab, Mack, Blumenthal & Evans

[57] ABSTRACT

A wiper arm, gearing and linkage are all installed in a housing so that an extensible and contractible wiper arm assembly is formed into a unit prior to installation on a vehicle body. In one embodiment, a one way clutch is interposed between a stationary gear and a stationary member of a windshield wiper to allow the stationary gear to be rotatable in one direction only relative to the stationary member.

12 Claims, 8 Drawing Figures

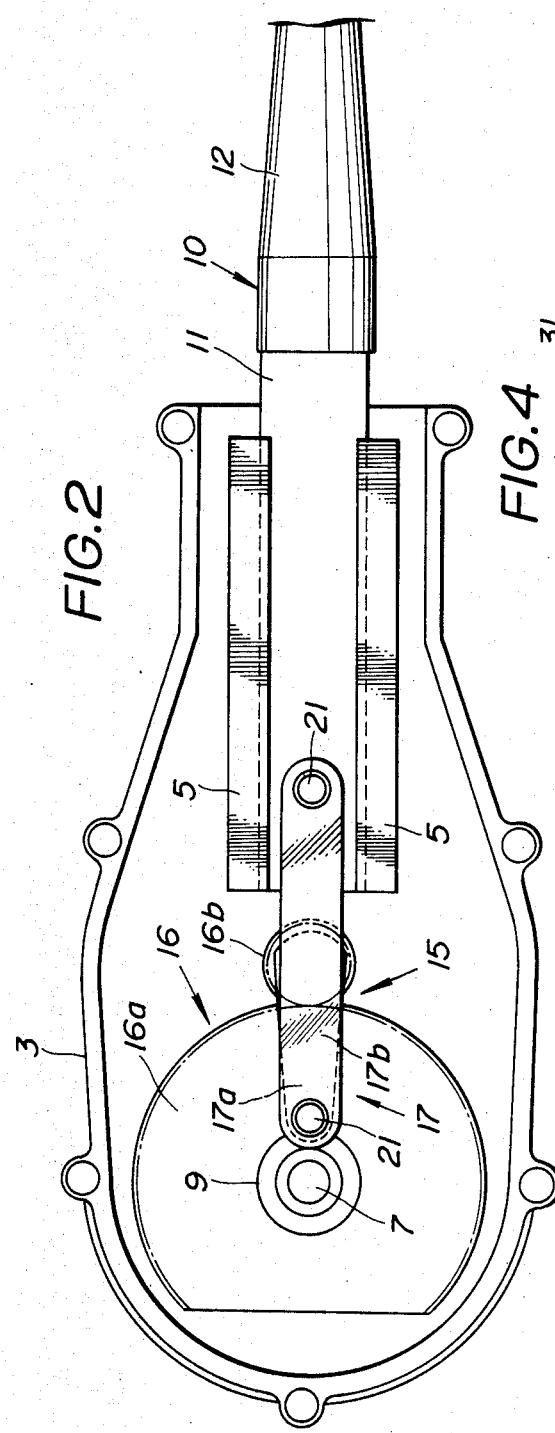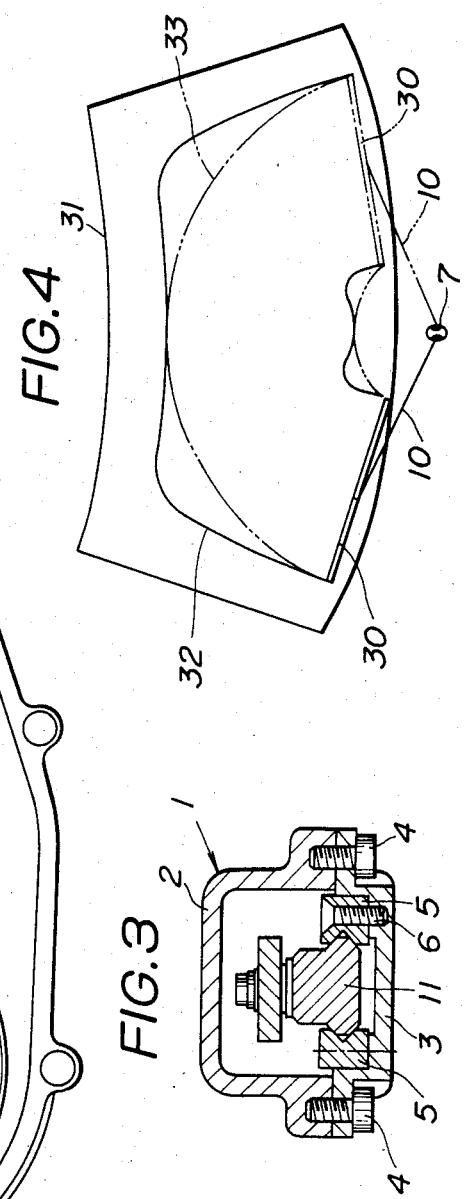

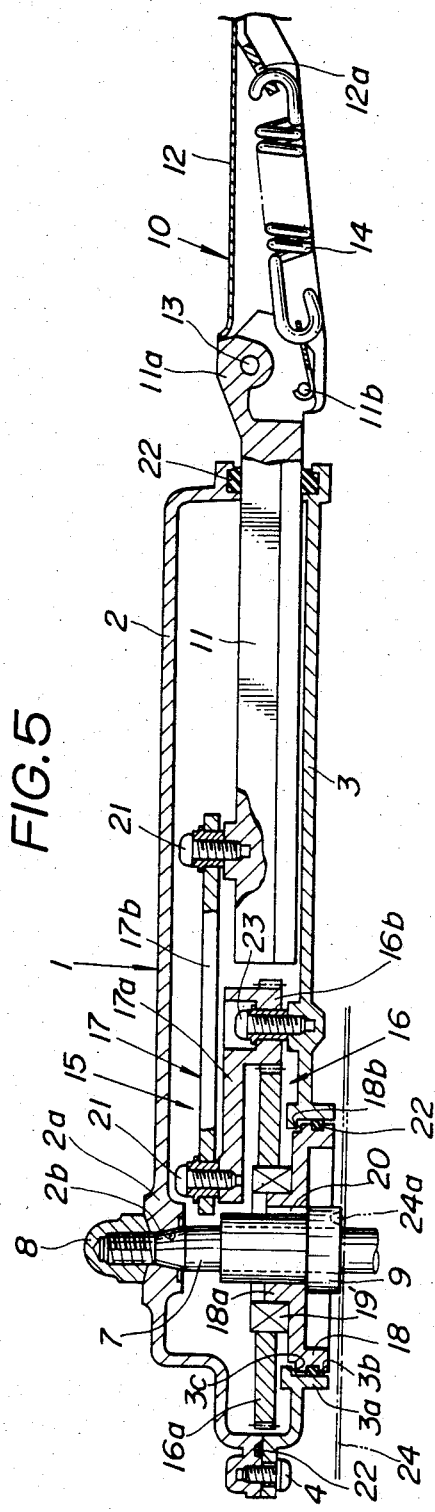

EXTENSIBLE AND CONTRACTIBLE WIPER ARM ASSEMBLY FOR WINDSHIELD WIPER

BACKGROUND OF THE INVENTION

1. Field of the Invention

The present invention relates in general to automotive vehicle windshield wipers and more particularly to a windshield wiper arm assembly of the type which extends and contracts as it swings with a pivot so as to attain an increased wipe area.

2. Description of the Prior Art

A windshield wiper arm assembly of the above described type is known as is disclosed in the Japanese Provisional Utility Model Publication No. 55-1570.

A disadvantage of the prior art extensible and contractible wiper arm assembly is that its installation on a pivot requires not only a difficult installation work but a delicate adjusting work since its constituent parts need to be installed separately for assemblage and thereafter adjusted so as to make the wiper arm assembly extensible and contractible at a desired timing.

SUMMARY OF THE INVENTION

In accordance with the present invention, there is provided a novel and improved extensible and contractible wiper arm assembly for a windshield wiper having an oscillatory pivot and a stationary member. The wiper arm assembly comprises a housing detachably mountable on the pivot to oscillate therewith, a wiper arm movably installed in the housing, a stationary gear disposed within the housing and concentric with the pivot, means for rotatably supporting the stationary gear on the housing and engageable with the stationary member to prevent rotation of the stationary gear relative to the stationary member, and an oscillatory pinion rotatably mounted on the housing and meshed with the stationary gear, and a linkage installed in the housing and drivingly interconnecting the oscillatory pinion and the wiper arm in such a manner that rotation of the oscillatory pinion causes the wiper arm to move toward and away from the housing.

The above structure makes it possible to form the wiper arm assembly into a unit prior to installation on the pivot. The wiper arm assembly in the form of a unit is readily and efficiently mountable on the pivot.

In one embodiment, the supporting means comprises a one way clutch interposed between the stationary gear and the stationary member to allow the stationary gear to be rotatable in one direction only relative to the stationary member. The provision of the one way clutch makes it possible to improve the wipe pattern.

It is accordingly an object of the present invention to provide a novel and improved extensible and contractible wiper arm assembly for an automotive vehicle windshield wiper which can be installed easily and efficiently.

It is another object of the present invention to provide a novel and improved extensible and contractible wiper arm assembly of the above described character which can be in the form of a unit prior to installation on the vehicle.

It is a further object of the present invention to provide a novel and improved extensible and contractible wiper arm assembly of the above described character of which treatment and handling prior to installation is quite easy.

It is a still further object of the present invention to provide a novel and improved extensible and contractible wiper arm assembly of the above described character which can be installed without requiring any delicate adjusting work for adjustment of a timing at which it extends and contracts.

It is a yet further object of the present invention to provide a novel and improved extensible and contractible wiper arm assembly of the above described character which can reduce the assembling expense.

It is a yet further object of the present invention to provide a novel and improved extensible and contractible wiper arm assembly of the above described character which can improve the wipe pattern.

BRIEF DESCRIPTION OF THE DRAWINGS

The features and advantages of the windshield wiper arm assembly according to the present invention will become more clearly appreciated from the following description taken in conjunction with the accompanying drawings, in which like reference numerals designate like or corresponding parts in the several views and wherein:

FIG. 2 is a plan view of the extensible and contractible wiper arm assembly of FIG. 1, with some parts being omitted;

FIG. 3 is a sectional view taken along the line III—III of FIG. 1;

FIG. 4 is a view of a wipe pattern attained by the extensible and contractible wiper arm assembly of the present invention;

FIG. 5 is a view similar to FIG. 1 but showing a modified embodiment of the present invention;

DETAILED DESCRIPTION OF THE PREFERRED EMBODIMENTS

Figure 1:
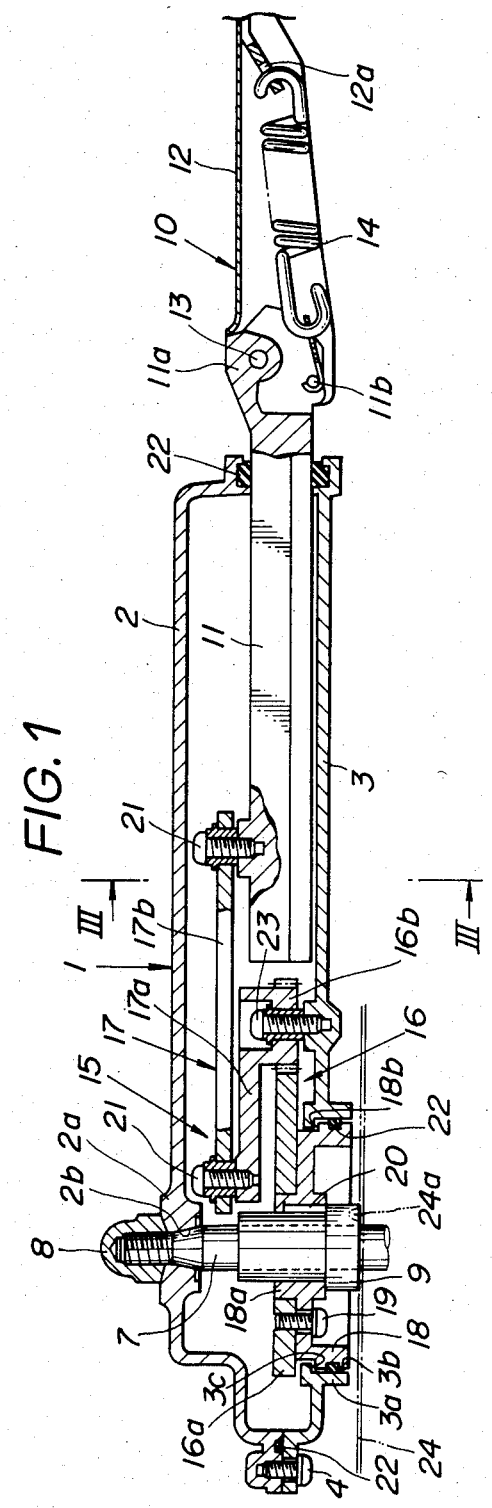
FIG. 1 is a sectional, partly broken away, view of a extensible and contractible wiper arm assembly according to an embodiment of the present invention.
Figure 6:
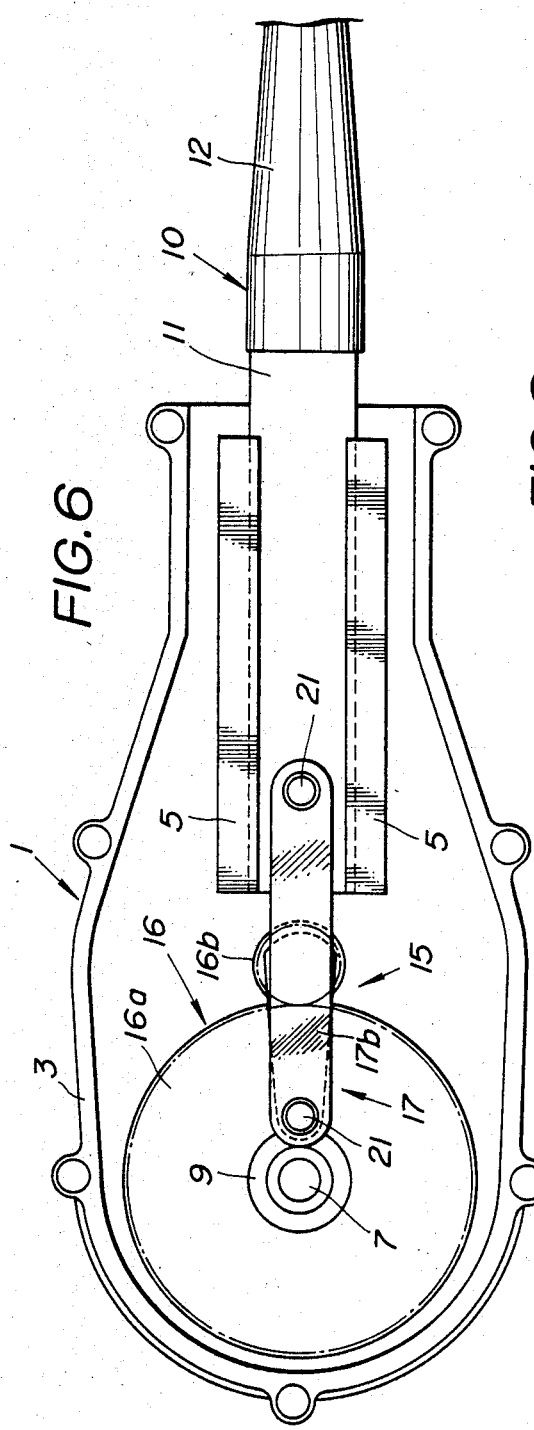
FIG. 6 is a view similar to FIG. 2 but showing the modified embodiment of FIG. 5.

Referring to FIGS. 1 through 4, generally indicated by the reference numeral 1 is an elongated housing consisting of an upper housing section 2 and a lower housing section 3 which are U-shaped in cross section and fastened together with bolts 4. The upper housing section 2 has adjacent an end thereof a boss portion 2a having a serrated opening 2b so that the housing 1 is detachably mountable at the boss portion 2a on a correspondingly serrated wiper arm drive shaft or pivot 7. The housing 1 is mounted on the pivot 7 and fastened thereto with a nut 8. Though not shown, the pivot 7 is drivingly connected to a wiper drive motor to be driven thereby to oscillate in a conventional manner. A pair of parallel guide rails 5 are disposed within the housing 1 and secured to the lower housing section 3 with bolts 6. A wiper arm 10 is engaged with the guide rails 5 in such a manner as to be movable toward and away from the housing 1, i.e., the wiper arm 10 and the housing 1 are extensible and contractible. The wiper arm 10 consists of a main arm section 11 slidably engaged with the guide rails 5 and having at an end disposed outside of the housing 1 an arm head 11a, and a sub-arm section 12 disposed outside the housing 1 and pivotally mounted on the arm head 11a of the main arm section 11 by means of a pivot pin 13. The sub-arm section 12 carries a wiper blade 30 (refer to FIG. 4.) at an end remoter from the main arm section 11. The arm head 11a has at a location spaced downward from the pivot pin 13 a spring anchor 11b, and the sub-arm section 12 has at a location intermediate between the opposite ends thereof a spring anchor 12a. A spring 14 is disposed between the anchors 11b, 12a and attached thereto in a tensioned stated so that the wiper blade 30 is urged toward a windshield 31 (refer to FIG. 4) by the bias of the spring 14. A wiper drive mechanism generally indicated by the reference numeral 15 is disposed within the housing 1 and consists of a gearing 16 and a linkage 17. The gearing 16 consists of a stationary gear 16a and an oscillatory pinion 16b. The stationary gear 16a is disposed concentric with the pivot 7 and secured with bolts 19 to a disk 18. The disk 18 is in turn mounted on a stationary pivot bearing 9 in the form of an elongated sleeve and secured to same with a key 20 to rotate therewith. The pivot bearing 9 is relatively rotatably mounted on the pivot 7 and lockingly engageable at an end thereof with a stationary member such as for example a projection-like member 24a provided to a vehicle body 24. The oscillatory pinion 16b is rotatably mounted on the lower housing section 3 by means of a bolt 23 and meshed with the stationary gear 16a. The lower housing section 3 has a boss portion 3a which is formed with a guide opening 3b aligned with the serrated opening 2b of the boss portion 2a of the upper housing section 2. The disk 18 has a shoulder 18b at the outer circumferential periphery thereof and is rotatably disposed in the guide opening 3b. The guide opening 3b is formed with a stopper 3c which is abuttingly engageable with the shoulder 18b to limit axial movement of the disk 18 inward of the housing 1. The stopper 3c is also abuttingly engageable with an end of the stationary gear 16a to limit axial movement of the disk 18 outward of the housing 1. The linkage 17 consists of an arm 17a integral with the oscillatory pinion 16b and a link 17b extending between a free end of the arm 17a and a portion of the main arm 11 adjacent an inner end thereof and pivotally connected to same with bolts 21 so that rotation of the oscillatory pinion 16b is converted into reciprocating motion of the link 17b and causes the wiper arm 10 to move toward and away from the housing 1. Indicated by the reference numeral 22 are a sealing members for providing seals between the disk 18 and the boss portion 3a of the lower housing section 3, between the upper and lower housing section 2, 3 and between the wiper arm 11 and the housing 1.

In operation, the pivot 7 is driven to oscillate together with the housing 1, causing the oscillatory pinion 16b to roll on the stationary gear 16a in one and the other directions cyclically. Rotation of the oscillatory pinion 16b is converted by the linkage 17 into reciprocating motion of the wiper arm 10, thus causing the housing 1 and the wiper arm 10 to extend and contract cyclically. Extension and contraction of the wiper arm assembly of the present invention is adapted so that a wipe pattern 32 as shown by the solid lines in FIG. 4 is attained. A comparative prior art windshield wiper arm of the inextensible type effects a wipe pattern 33, as indicated by the two-dot-chain lines in FIG. 4, which is part of a ring-shaped area about the pivot 7.

More specifically, this embodiment is adapted so that the wiper arm 10 turns about 180° between maximumly rightward and leftward positions in the drawing and that a half cyclic turn (180° turn away from the maximumly rightward position) of the wiper arm 10 causes two turns of the oscillatory pinion 16b on the stationary gear 16a. An about 45° turn of the wiper arm 10 away from the maximumly rightward position (maximumly retracted position) therefore causes a half turn of the oscillatory pinion 16b on the stationary gear 16a. This causes the joint between arm 17a and the link 17b to turn 180° about the oscillatory pinion 16b and therefore the wiper arm 10 to project maximumly from the housing 1. A further about 45° turn of the wiper arm 10 causes the above described joint to return to the former position and therefore the wiper arm 10 to retract maximumly into the housing 1.

The above action of the wiper arm 10 is repeated during 90° to 180° turning thereof away from the maximumly rightward position. The wipe pattern 32 of this embodiment is therefore modified, as compared with the wipe pattern 33 of the inextensible type wiper arm, so as to have two nearly triangular protrusions and increase in wipe area.

In the foregoing, it is to be noted that the wiper arm assembly of the present invention can be installed on the pivot 7 easily and efficiently since it is formed into unit prior to installation on the pivot 7, i.e., the wiper arm 10, gearing 16 and linkage 17 are assembled and installed in the housing 1 which is in turn readily mountable on the pivot 7.

It is further to be noted that installation of the wiper arm assembly of the present invention does not require any delicate adjusting work for adjustment of the timing at which the wiper arm 10 and the housing 1 extend and contract since the gearing 16 and linkage 17 are preassembled so as to attain the desired timing provided that the pivot bearing 9 is disposed in place to lockingly engage the stationary member 24a, making it possible to attain a desired wipe pattern readily and assuredly.

Referring to FIGS. 5 to 8, a modified embodiment of the present invention will now be described. This embodiment differs from the previous embodiment in that the stationary gear 16a is mounted on a hub portion 18a of the disk 18 by way of a one way clutch 19' so as to be rotatable in one direction only relative to the stationary pivot bearing 9, i.e., so as to be rotatable while held stationarily engaged with the oscillatory pinion 16b during turning of the wiper arm 10 away from the maximumly rightward position to the maximumly leftward position (forward turning) and held stationary relative to the pivot bearing 9 during turning of the pivot arm 9 away from the maximumly leftward position to the maximumly rightward position (backward turning).

Figure 7:
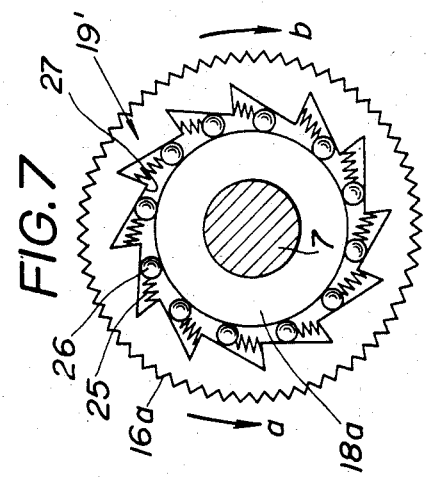
FIG. 7 is a schematic view of a one way clutch employed in the embodiment of FIG. 5.

An example of the one way clutch 19' is shown in FIG. 7. As illustrated, the one way clutch 19' consists of a plurality of ratchet teeth 27 provided to the inner circumferential periphery of the stationary gear 16a, a plurality of balls 26 disposed between the ratchet teeth 24 and the hub portion 18a of the disk 18 and a plurality of springs 25 urging the balls 26 to be driven between the ratchet teeth 24 and the hub portion 18a of the disk 18. With the above structure, the one way clutch 19' is adapted so that during forward turning of the wiper arm 10, the stationary gear 16a is urged to rotate in the direction "a" and causes the balls 26 to be driven between the ratchet teeth 27 and the hub portion 18a of the disk 18, thus engaging the clutch 19'. On the other hand, during backward turning of the wiper arm 10, the stationary gear 16a is urged to rotate in the direction "b" and allows the balls 26 to slide on the hub portion 18a of the disk 18, thus disengaging the clutch 19'.

Figure 8:
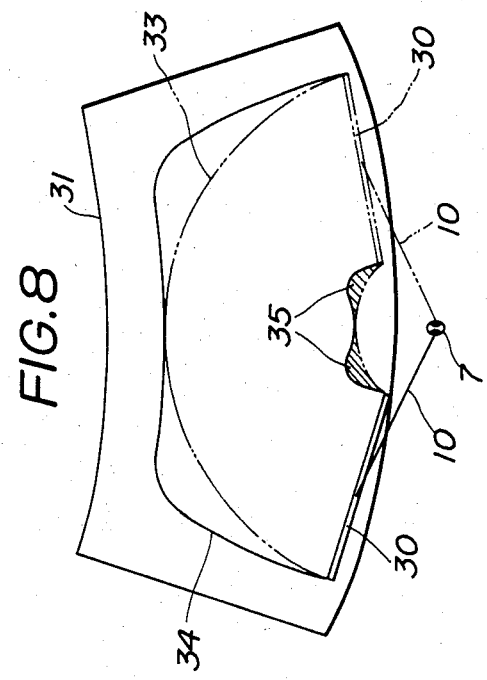
FIG. 8 is a view of a wipe pattern attained by the embodiment of FIG. 5.

With the above structure, the wiper arm 10 is held in the maximumly retracted state during backward turning of the wiper arm 10 and effects the same extending and contracting action as the previous embodiment during forward turning of the wiper arm 10. This embodiment is therefore adapted so that the hatched area 35 in FIG. 8 is wiped by the wiper blade 30 during backward turning of the wiper arm 10. In contrast to this, the previous embodiment is adapted so that the hatchet area 35 is remained unwiped even during backward turning of the wiper arm 10 since the wiper arm 10 effects the extending and contracting action during not only forward turning but backward turning. This embodiment therefore effects a wipe pattern 34 which is further increased in area as compared with that 32 of the previous embodiment. Except for the above, this embodiment is substantially similar to the previous embodiment and can produce substantially the same effect.

What is claimed is:

1. An extensible and contractible wiper arm assembly for a windshield wiper having an oscillatory pivot and a stationary member, comprising:
   a housing detachably mountable on the pivot to oscillate therewith;
   a wiper arm movably installed in said housing;
   a stationary gear disposed within said housing and concentric with said pivot;
   means for rotatably supporting said stationary gear on said housing and engageable with the stationary member to prevent rotation of said stationary gear relative to the stationary member;
   an oscillatory pinion rotatably mounted on said housing and meshed with said stationary gear; and
   a linkage installed in said housing and drivingly interconnecting said oscillatory pinion and said wiper arm in such a manner that rotation of said oscillatory pinion causes said wiper arm to move toward and away from said housing;
   said means for rotatably supporting said stationary gear further comprises a pivot bearing in which the pivot is relatively rotatable, said pivot bearing partly projecting into said housing to mount thereon said stationary gear in such a manner as to prevent relative rotation between said pivot bearing and said stationary gear and partly projecting out of said housing so as to be lockingly engageable with the stationary member.

2. An extensible and contractible wiper arm assembly as set forth in claim 1, in which said housing comprises first and second housing sections which are U-shaped in cross section, said first housing section having a serrated opening for engagement with a correspondingly serrated portion of the pivot, said second housing section having a guide opening concentric with said serrated opening, said supporting means further comprising a disk carrying thereon said stationary gear and mounted on said pivot bearing, said disk rotatably mountable on the pivot while being rotatably received in said guide opening, said disk having a shoulder at the outer circumferential periphery thereof, said guide opening having a stopper which cooperates with said shoulder to limit axial movement of said disk inward of said housing.

3. An extensible and contractible wiper arm assembly as set forth in claim 2, in which said stopper is abuttingly engageable with an axial end of said stationary gear to limit axial movement of said disk outward of said housing.

4. An extensible and contractible wiper arm assembly as set forth in claim 1, further comprising a pair of parallel guide rails secured to said second housing section, said wiper arm being slidably engaged with said guide rails.

5. An extensible and contractible wiper arm assembly as set forth in claim 4, in which said linkage comprises an arm integral with said oscillatory pinion rotatably mounted on said second housing section and a link pivotally connected at the opposite ends thereof to said arm and said wiper arm, respectively.

6. An extensible and contractible wiper arm assembly as set forth in claim 1, in which said supporting means further comprises a one way clutch interposed between said stationary gear and said pivot bearing to allow said stationary gear to be rotatable in one direction only relative to the stationary member.

7. An extensible and contractable wiper arm assembly for a windshield wiper having an oscillatory pivot and a stationary member, comprising:
   a housing detachably mountable on the pivot to oscillate therewith and having first and second housing sections which are U-shaped in cross section, said first housing section having a serrated opening for mounting said housing on the pivot and said second housing section having a guide opening concentric with said serrated opening;
   a wiper arm movably installed in said housing;
   a stationary gear disposed within said housing and concentric with said pivot;
   means for rotatably supporting said stationary gear on said housing and engageable with the stationary member to prevent rotation of said stationary gear relative to the stationary member, said means for rotatably supporting said stationary gear comprising a disk carryig thereon said stationary gear and rotatably mountable on the pivot while being rotatably received in said guide opening, said disk having a shoulder at the outer circumferential periphery thereof and said guide opening having a stopper which cooperates with said shoulder to limit axial movement of said disk inward of said housing;
   an oscillatory pinion rotatably mounted on said housing and matched with said stationary gear; and
   a linkage installed in said housing and drivingly interconnecting said oscillatory pinion and said wiper arm in such a manner that rotation of said oscillatory pinion causes said wiper arm to move toward and away from said housing.

8. An extensible and contractable wiper arm assemly as claimed in claim 7, wherein:
   said stopper is abuttingly engageable with an axial end of said stationary gear to limit axial movement of said disk outward of said housing.

9. An extensible and contractable wiper arm assembly as set forth in claim 8, wherein:
   said means for rotataly supporting said stationary gear further comprises a pivot bearing in which the pivot is relatively rotatable and on which said disk is mounted, said pivot bearing being in the form of an elongated sleeve and lockingly engageable with the stationary member.

10. An extensible and contractable wiper arm assembly as set forth in claim 9, and further comprising:

a pair of parallel guide rails secured to said second housing section, said wiper arm being slidably engaged with said guide rails.

11. An extensible and contractable wiper arm assembly as claimed in claim 10, wherein:

said linkage comprises an arm integral with said oscillatory pinion rotatably mounted on said second housing section and a link pivotally connected at the opposite ends thereof to said arm and said wiper arm, respectively.

12. An extensible and contractable wiper arm assembly as claimed in claim 7, wherein:

said supporting means comproses a one-way clutch interposed between said stationary gear and the stationary member to allow said stationary gear to be rotatable in one direction only relative to the stationary member.

* * * * *